US009819958B2

United States Patent
Imai et al.

(10) Patent No.: US 9,819,958 B2
(45) Date of Patent: Nov. 14, 2017

(54) DRAWING SYSTEM, INFORMATION PROCESSING APPARATUS AND DRAWING CONTROL METHOD WHICH SWITCH DRAWING FROM STILL IMAGE DATA TO VIDEO IMAGE DATA

(71) Applicant: FUJITSU LIMITED, Kawasaki-shi, Kanagawa (JP)

(72) Inventors: Tomoharu Imai, Kawasaki (JP); Kazuki Matsui, Kawasaki (JP); Masahiko Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 100 days.

(21) Appl. No.: 14/742,266

(22) Filed: Jun. 17, 2015

(65) Prior Publication Data

US 2015/0381987 A1     Dec. 31, 2015

(30) Foreign Application Priority Data

Jun. 27, 2014  (JP) ................................. 2014-132949

(51) Int. Cl.
H04N 7/12       (2006.01)
H04N 19/507    (2014.01)

(52) U.S. Cl.
CPC .................................. *H04N 19/507* (2014.11)

(58) Field of Classification Search
CPC ..................................................... H04N 19/159
See application file for complete search history.

(56) References Cited

U.S. PATENT DOCUMENTS

2011/0276653 A1   11/2011   Matsui et al.

FOREIGN PATENT DOCUMENTS

JP   2003-209828   7/2003
JP   2011-238014   11/2011

OTHER PUBLICATIONS

"Welcome to TigerVNC", [online], SourceForge.net, <URL: http://sourceforge.net/apps/mediawiki/tigervnc/index.php?title=Welcome_to_TigerVNC>, Aug. 21, 2013, pp. 1-2.

*Primary Examiner* — Young Lee
(74) *Attorney, Agent, or Firm* — Staas & Halsey LLP

(57) ABSTRACT

A drawing system includes an information processing apparatus which includes a generation unit for generating video data for a frequently changed region whose change frequency in an image exceeds a predetermined threshold, and generate still image data for the video data, and a first communication unit for transmitting the video and still image data to a terminal apparatus; and the terminal apparatus which includes a second communication unit for receiving the video and still image data from the information processing apparatus, a decoder unit for decoding the video and still image data, and a drawing unit for drawing a the decoded still image data when decoding of the video data is not completed by drawing timing, and to switch the drawing of the decoded still image data to drawing of a decoded video data when the decoding of the video data catches up with the drawing timing.

7 Claims, 12 Drawing Sheets

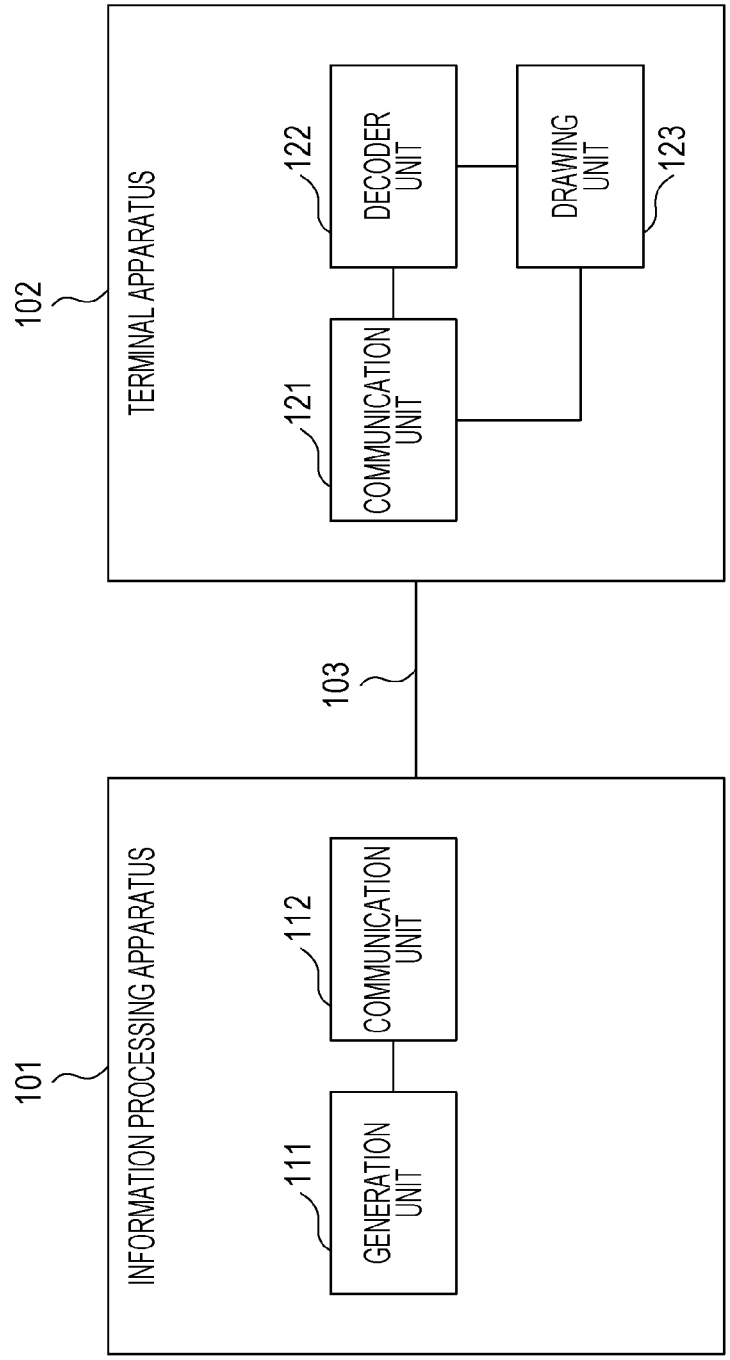

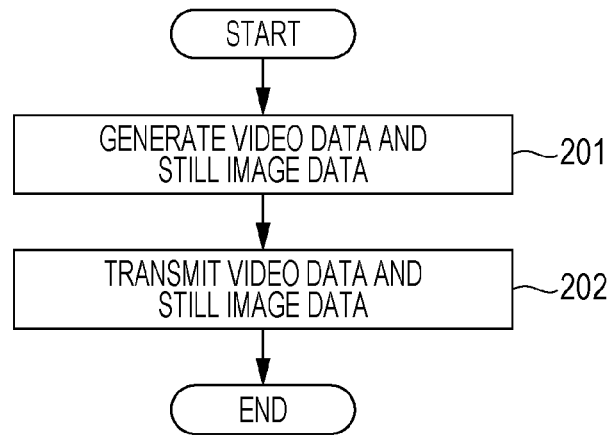
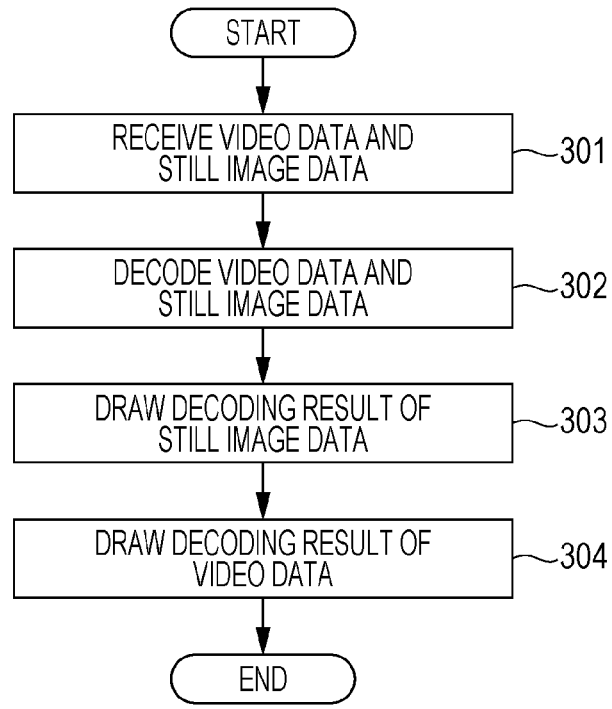

FIG. 4
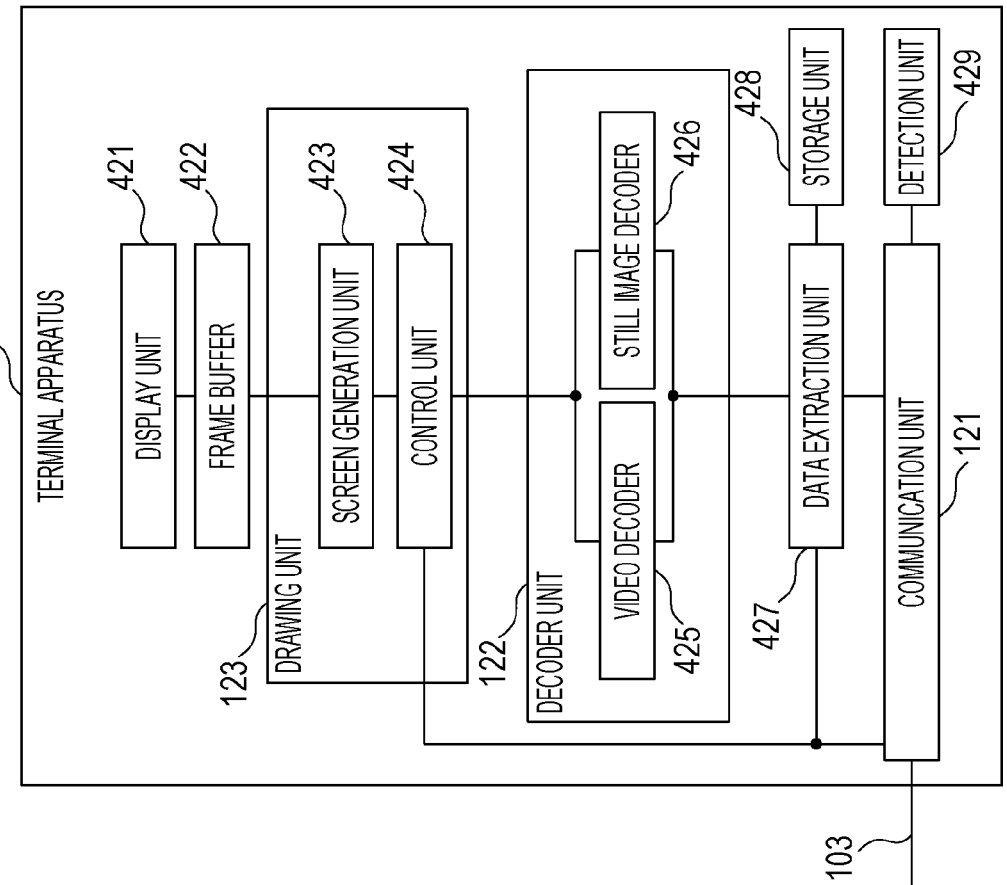
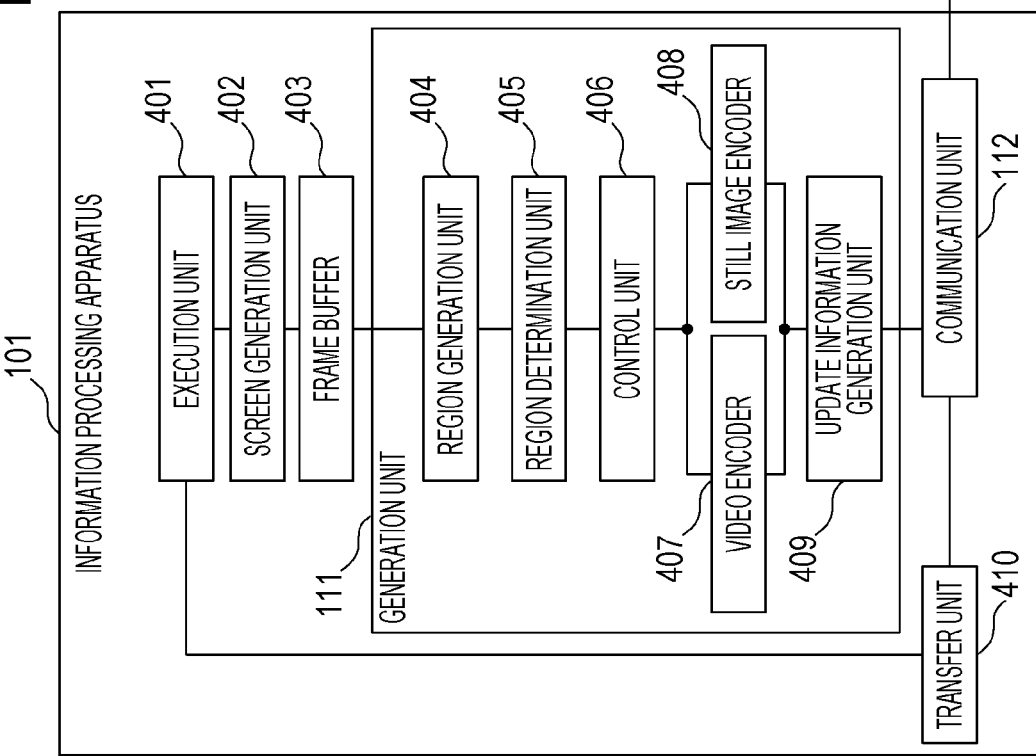

DRAWING SYSTEM, INFORMATION PROCESSING APPARATUS AND DRAWING CONTROL METHOD WHICH SWITCH DRAWING FROM STILL IMAGE DATA TO VIDEO IMAGE DATA

CROSS-REFERENCE TO RELATED APPLICATION

This application is based upon and claims the benefit of priority of the prior Japanese Patent Application No. 2014-132949, filed on Jun. 27, 2014, the entire contents of which are incorporated herein by reference.

FIELD

The embodiment discussed herein is related to a drawing system, an information processing apparatus for drawing, and a drawing control method.

BACKGROUND

In an information processing system called a thin client system, a server manages resources, such as application programs and files, and a client terminal has minimum functions to use such resources. Hereinafter, the application programs may simply be described as the "applications".

In such a thin client system, the client terminal acts as if the client terminal plays a key role in executing processing and holding data while displaying a result of processing executed by the server and data held by the server on a screen of the client terminal.

For example, the server in the thin client system may execute a service application regarding services such as document preparation and e-mail, and display a processing result of the application on the client terminal. It is preferable that, besides such a service application, an application handling high-resolution images, such as computer aided design (CAD), and an application handling videos or moving images, and the like are expanded as the range of application of the thin client system.

As a communication protocol in the thin client system, a Remote Desktop Protocol (RDP), a Remote Frame Buffer (RFB) protocol, and the like are known, for example. The RFB protocol is a protocol used in Virtual Network Computing (VNC) (see, for example, "Welcome to TigerVNC", [online], [Searched on Jun. 4, 2014], Internet <URL: http://sourceforge.net/apps/mediawiki/tigervnc/index.php?title=Welcome_to_TigerVNC>).

In the case of handling large volumes of data, such as images and videos, using such communication protocols, there is a problem of an impaired response to an operation executed by the client terminal. Such a problem is not limited to the case of handling images and videos but is common to the case where large volumes of data are transmitted between the server and the client terminal during screen update and the like in the thin client system.

Therefore, application of an image compression algorithm with a different compression rate to screen data may optimize a data transfer amount between the server and the client terminal. For example, by using a lossy compression algorithm to compress the screen data, the data transfer amount may be significantly reduced in exchange for reduction in image quality, thereby improving the response to the operation.

There has also been known an information processing apparatus configured to divide an image for displaying an execution result of a computer on a display unit in a terminal apparatus into regions and transmit an image in a frequently changed region by video compression (see, for example, Japanese Laid-open Patent Publication No. 2011-238014).

There has also been known a video real-time distribution system configured to distribute video data in real time from an image coding transmission apparatus to a client terminal through an image server (see, for example, Japanese Laid-open Patent Publication No. 2003-209828). This video real-time distribution system performs disconnection and reconnection between the image server and the client terminal every time the amount of image data held in the image server reaches a certain value or more.

SUMMARY

According to an aspect of the invention, a drawing system includes an information processing apparatus including a generation unit configured to generate video data corresponding to a frequently changed region whose change frequency in an image exceeds a predetermined threshold, and generate still image data corresponding to the video data, and a first communication unit configured to transmit the video data and the still image data to a terminal apparatus; and the terminal apparatus including a second communication unit configured to receive the video data and the still image data from the information processing apparatus, a decoder unit configured to decode the video data and the still image data, and a drawing unit configured to draw a decoding result of the still image data when decoding of the video data is not completed by drawing timing, and to switch the drawing of the decoding result of the still image data to drawing of a decoding result of the video data when the decoding of the video data catches up with the drawing timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration diagram of a drawing system;
FIG. 2 is a flowchart of drawing control processing;
FIG. 3 is a flowchart of drawing processing;
FIG. 4 is a diagram illustrating a specific example of the drawing system;
FIG. 11 is a flowchart of control processing in which drawing data of video data is not waited for;
FIG. 12 is a timing chart of drawing processing in which drawing data of video data is not waited for.

DESCRIPTION OF EMBODIMENTS

Figure 5:
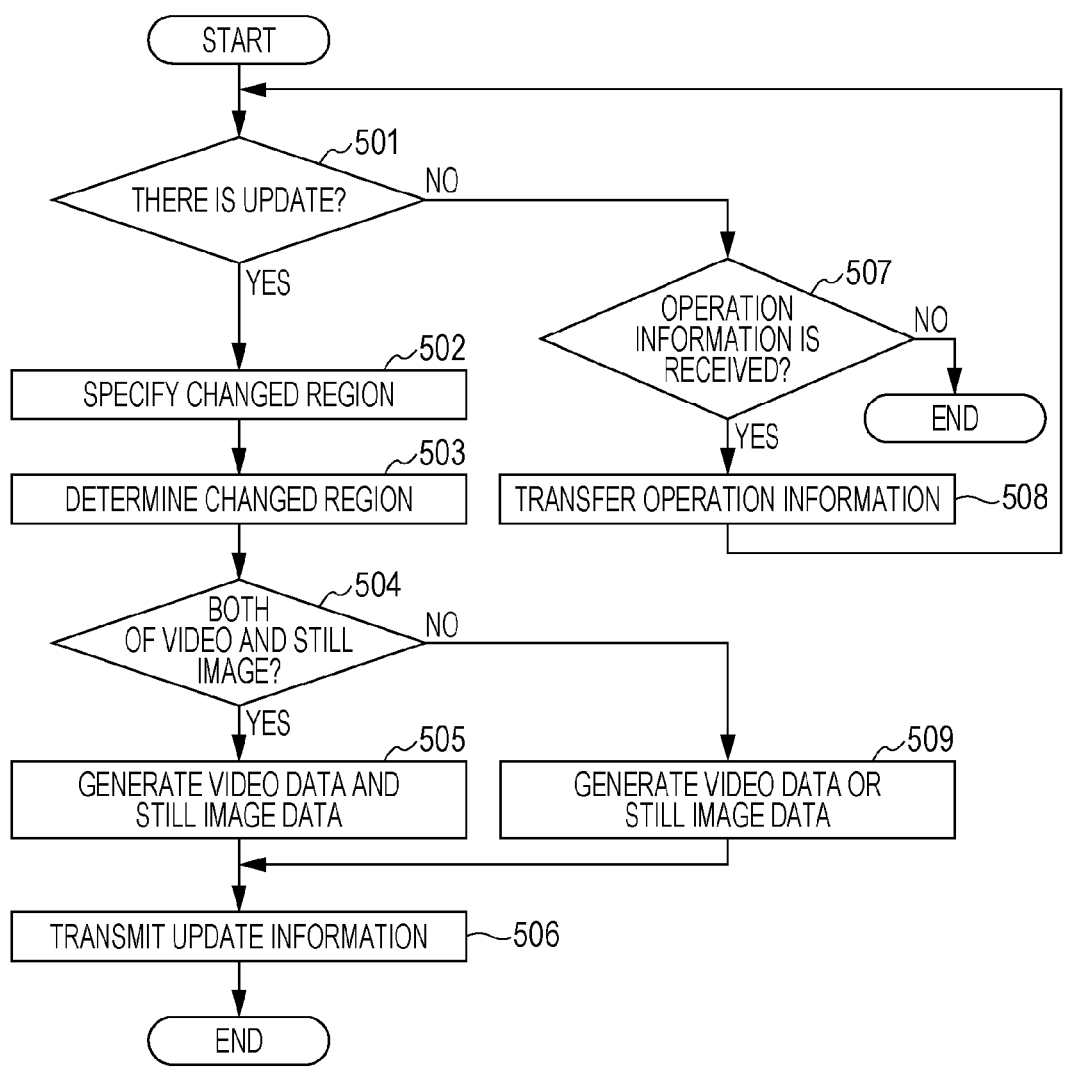
FIG. 5 is a flowchart illustrating a specific example of the drawing control processing.

The conventional thin client system has the following problem. In the thin client system, when the server uses video data to transmit screen data to the client terminal, it is difficult to properly control a drawing delay in the client terminal.

Note that such a problem occurs not only when the screen data is transmitted from the server to the client terminal in the thin client system but also when images are transmitted from an information processing apparatus to a terminal apparatus in another information processing system.

Accordingly, it is desired to properly control a drawing delay in a terminal apparatus configured to receive images from an information processing apparatus.

Hereinafter, with reference to the drawings, an embodiment is described in detail below. In a thin client system, a server may encode screen data using a codec corresponding to a network band or image quality setting by a user, and transmit the encoded screen data to a client terminal. The client terminal may realize smooth operability by decoding the received screen data in real time and displaying the decoded screen data on a screen. The codec for encoding or decoding the screen data may be classified broadly into two kinds, a still image codec, and a video codec.

As the still image codec, Joint Photographic Experts Group (JPEG), Portable Network Graphics (PNG), WebP or the like may be used, for example. In such still image codecs, time it takes to perform decoding is determined according to a compression algorithm used and the size of a screen region to be compressed.

Meanwhile, as the video codec, Moving Picture Experts Group phase 4 (MPEG4), H.264 or the like may be used, for example. In such video codecs, time it takes to perform decoding varies depending on not only the compression algorithm and the size of a screen region but also which timing frame includes the screen region. Particularly, in the case of decoding the first frame of a video, initialization of a decoder itself is performed in addition to usual decoding. As a result, it takes more time to perform the decoding.

According to how frequently the screen region is changed, the server may encode a frequently changed region as video data and transmit the video data to the client terminal, and the server may also encode a less frequently changed region as still image data and transmit the still image data to the client terminal. In this case, the video data of the frequently changed region has a smaller data transfer amount compared with the still image data of the less frequently changed region, and thus may be transmitted more rapidly. However, processing load of the video data at the client terminal is higher than that of the still image data. Therefore, update of a frame is not finished in time, which may cause a drawing delay during drawing of screen data on the screen. Such a drawing delay impairs the operability of the client terminal.

Particularly, it takes more time to decode the first frame of the video data than the other frames. Thus, it is considered that an initial frame rate is lowered to cause the drawing delay.

FIG. 1 illustrates a configuration example of a drawing system according to an embodiment. The drawing system illustrated in FIG. 1 includes an information processing apparatus 101 and a terminal apparatus 102. The information processing apparatus 101 and the terminal apparatus 102 are connected through a wireless or wired communication network 103. The information processing apparatus 101 includes a generation unit 111 and a communication unit 112. The terminal apparatus 102 includes a communication unit 121, a decoder unit 122 and a drawing unit 123.

FIG. 2 is a flowchart illustrating an example of drawing control processing performed by the information processing apparatus 101 illustrated in FIG. 1. First, the generation unit 111 generates video data corresponding to a frequently changed region whose change frequency in an image exceeds a predetermined threshold, and also generates still image data corresponding to the video data (Step 201). Next, the communication unit 112 transmits the video data and the still image data to the terminal apparatus 102 (Step 202).

FIG. 3 is a flowchart illustrating drawing processing performed by the terminal apparatus 102 illustrated in FIG. 1. First, the communication unit 121 receives the video data and the still image data from the information processing apparatus 101 (Step 301). Next, the decoder unit 122 decodes the video data and the still image data (Step 302). Then, when the decoding of the video data is not completed by drawing timing, the drawing unit 123 draws a decoding result of the still image data (Step 303). On the other hand, when the decoding of the video data catches up with the drawing timing, the drawing of the decoding result of the still image data is switched to drawing of a decoding result of the video data (Step 304).

The drawing system as described above may properly control a drawing delay in the terminal apparatus 102 configured to receive images from the information processing apparatus 101.

FIG. 4 illustrates a specific example of the drawing system illustrated in FIG. 1. The information processing apparatus 101 illustrated in FIG. 4 includes the generation unit 111, the communication unit 112, an execution unit 401, a screen generation unit 402, a frame buffer 403, and a transfer unit 410. The generation unit 111 includes a region generation unit 404, a region determination unit 405, a control unit 406, a video encoder 407, a still image encoder 408, and an update information generation unit 409.

The information processing apparatus 101 may be a server in a thin client system or may be a transmission apparatus configured to transmit images to the terminal apparatus 102 in another information processing system.

The communication unit 112 may maintain one connection with the terminal apparatus 102. The communication unit 112 transmits update information generated by the generation unit 111 to the terminal apparatus 102, and receives operation information from the terminal apparatus 102. The transfer unit 410 transfers the operation information received by the communication unit 112 to the execution unit 401.

The execution unit 401 executes an operating system and various applications based on the operation information transferred from the transfer unit 410, and issues a drawing command to the screen generation unit 402 based on a result of the execution. A Graphic Device Interface (GDI) command, for example, may be used as the drawing command. The screen generation unit 402 generates an image to be displayed on a screen of the terminal apparatus 102, based on the drawing command, and stores the image in the frame buffer 403.

The region generation unit 404 periodically checks the images in the frame buffer 403, determines a region that has changed since the previous check to be a changed region, and transfers changed region information indicating the changed region to the region determination unit 405. The region determination unit 405 transfers the changed region information to the control unit 406, and determines a frequently changed region whose change frequency exceeds a predetermined threshold to be a video region based on images in respective frames within a certain period. Then, the region determination unit 405 transfers video region information indicating the video region to the control unit 406. As a method for specifying the frequently changed region, the method described in Japanese Laid-open Patent Publication No. 2011-238014 may be used, for example.

The control unit 406 transfers the changed region information transferred from the region determination unit 405 to the still image encoder 408. When there is a drawing delay of the video data in the terminal apparatus 102, the control unit 406 transfers the video region information transferred from the region determination unit 405 to the video encoder 407, converts the video region information into changed region information, and transfers the changed region information to the still image encoder 408. When the drawing delay in the terminal apparatus 102 is resolved, the control unit 406 transfers the video region information only to the video encoder 407. Whether or not there is a drawing delay in the terminal apparatus 102 is notified from the terminal apparatus 102 to the control unit 406 through the communication unit 112.

The video encoder 407 uses a video codec to encode an image in the video region based on the video region information, thereby generating video data. Then, the video encoder 407 transfers the video data to the update information generation unit 409. The video data may contain coded pictures corresponding to the same changed region in frames.

The still image encoder 408 uses a still image codec to encode an image in the changed region based on the changed region information, thereby generating still image data. Then, the still image encoder 408 transfers the still image data to the update information generation unit 409. The still image data contains one or more coded images corresponding to the changed region in one or more frames.

The update information generation unit 409 generates update information including video data or still image data, and transfers the update information to the communication unit 112. The communication unit 112 transmits the update information to the terminal apparatus 102.

The terminal apparatus 102 illustrated in FIG. 4 includes the communication unit 121, the decoder unit 122, the drawing unit 123, a display unit 421, a frame buffer 422, a data extraction unit 427, a storage unit 428, and a detection unit 429. The decoder unit 122 includes a video decoder 425 and a still image decoder 426. The drawing unit 123 includes a screen generation unit 423 and a control unit 424.

The terminal apparatus 102 may be a client terminal in the thin client system or may be a reception apparatus configured to receive images from the information processing apparatus 101 in another information processing system. As the terminal apparatus 102, a desktop personal computer (desktop PC), a laptop PC, a personal digital assistant (PDA), a smartphone, a tablet, a portable game machine, a portable music player, or the like may be used.

The detection unit 429 detects user operation information in the terminal apparatus 102, and transfers the operation information to the communication unit 121. The communication unit 121 may maintain one connection with the information processing apparatus 101. The communication unit 121 transmits the operation information to the information processing apparatus 101, and receives the update information from the information processing apparatus 101.

When video data is extracted from the update information received by the communication unit 121, the data extraction unit 427 transfers the extracted video data to the video decoder 425. Meanwhile, when still image data is extracted from the update information, the data extraction unit 427 transfers the extracted still image data to the still image decoder 426. In this event, the data extraction unit 427 records the reception time of the update information in the storage unit 428.

The video decoder 425 uses a video codec to decode the video data, thereby generating drawing data that is a result of the decoding. Then, the video decoder 425 transfers the drawing data of the video data to the control unit 424. In this event, drawing data of frames is generated from the encoded pictures contained in the video data.

The still image decoder 426 uses a still image codec to decode the still image data, thereby generating drawing data that is a result of the decoding. Then, the still image decoder 426 transfers the drawing data of the still image data to the control unit 424. In this event, drawing data of one or more frames is generated from one or more encoded images contained in the still image data.

The control unit 424 checks whether or not the decoding of the video data is completed by the drawing timing, based on the reception time recorded in the storage unit 428. The drawing timing of the video data indicates the time to perform drawing which is based on the drawing data generated from the video data, and may include more than one drawing time corresponding to more than one frame of the video data.

When the decoding of the video data is not completed by the drawing timing, the control unit 424 transfers the drawing data of the still image data to the screen generation unit 423, and notifies the information processing apparatus 101 of the occurrence of a drawing delay through the communication unit 121. On the other hand, when the decoding of the video data catches up with the drawing timing, the control unit 424 transfers the drawing data of the video data to the screen generation unit 423, and notifies the information processing apparatus 101 of the resolution of the drawing delay through the communication unit 121.

The screen generation unit 423 develops the drawing data of the still image data or the drawing data of the video data to generate an image to be displayed on the screen of the terminal apparatus 102, and stores the image in the frame buffer 422. The display unit 421 reads the image from the frame buffer 422, and displays the image on the screen.

As described above, since the information processing apparatus 101 generates the video data as well as the still image data and transmits the both data to the terminal apparatus 102, the terminal apparatus 102 may perform drawing using the decoding result of the still image data even when the decoding of the video data is not completed by the drawing timing. Thus, smooth operability may be realized while suppressing a drawing delay by maintaining a frame rate in the terminal apparatus 102. Particularly, during decoding of the first frame of the video data, reduction in the frame rate may be reduced by drawing the decoding result of the still image data instead.

Note that the control unit 406 in the information processing apparatus 101 may transfer the video region information to the video encoder 407 and the still image encoder 408, considering that there is a drawing delay until notified of the resolution of the drawing delay from the terminal apparatus 102. In this case, the control unit 424 in the terminal apparatus 102 does not have to notify the information processing apparatus 101 of the occurrence of the drawing delay, and may notify only the resolution of the drawing delay.

The terminal apparatus 102 instructs the information processing apparatus 101 to terminate the transmission of the still image data corresponding to the video region, by notifying the information processing apparatus 101 of the resolution of the drawing delay. According to the instruction, the generation unit 111 in the information processing apparatus 101 terminates the generation of the still image data corresponding to the video region, and the communication unit 112 terminates the transmission of the still image data corresponding to the video region. Thus, generation and transmission of unnecessary still image data are suppressed. As a result, processing load of the information processing apparatus 101 and the terminal apparatus 102 may be reduced, and an increase in data transfer amount may be suppressed.

FIG. 5 is a flowchart illustrating a specific example of the drawing control processing performed by the information processing apparatus 101 illustrated in FIG. 4. The information processing apparatus 101 starts the drawing control processing illustrated in FIG. 5 at a predetermined timing. The information processing apparatus 101 may start the drawing control processing at regular time intervals.

First, the region generation unit 404 checks whether or not the image in the frame buffer 403 is updated (Step 501). When the image is updated (Step 501, YES), the region generation unit 404 specifies a changed region and generates changed region information (Step 502).

The changed region is a region where there is a change between the previous and the latest frames stored in the frame buffer 403, for example. The changed region information may contain region information indicating the location and size of the changed region. When the changed region is expressed by a rectangular shape, for example, the region information may contain x and y coordinates indicating the location of the rectangular shape on the image in the frame buffer 403 as well as the height w and width h of the rectangular shape. In this case, the region information may be described as (x, y, w, h)=(10, 10, 120, 240).

The changed region information may also contain image quality information indicating the image quality of the still image data in the changed region. As the image quality indicated by the image quality information, image quality corresponding to a less frequently changed region whose change frequency does not exceed a predetermined threshold may be used.

Next, the region determination unit 405 checks whether or not the changed region indicated by the changed region information is a frequently changed region, determines the frequently changed region to be a video region, and generates video region information indicating the video region (Step 503). As in the case of the changed region information, the video region information may also contain region information indicating the location and size of the video region.

Next, the control unit 406 determines whether to generate both of video data and still image data, based on the changed region information, the video region information, and the presence or absence of a drawing delay (Step 504). When both of video data and still image data are to be generated (Step 504, YES), the control unit 406 transfers the video region information to the video encoder 407, converts the video region information into changed region information, and transfers the changed region information to the still image encoder 408. Then, the video encoder 407 generates video data, and the still image encoder 408 generates still image data (Step 505).

In this event, the changed region information generated from the video region information may contain image quality information indicating the image quality of the still image data as well as region information of the video region information. As the image quality indicated by the image quality information, image quality corresponding to the less frequently changed region may be used, or image quality lower than the image quality corresponding to the less frequently changed region may be used. In the case of using the image quality lower than the image quality corresponding to the less frequently changed region, the still image data corresponding to the video data may be set to have low image quality. Thus, the data transfer amount of the still image data corresponding to the video data is reduced, and the processing load of the information processing apparatus 101 and the terminal apparatus 102 is reduced.

On the other hand, when one of video data and still image data is to be generated (Step 504, NO), the control unit 406 transfers the video region information to the video encoder 407 or transfers the changed region information to the still image encoder 408. The video encoder 407 generates video data when the video region information is transferred, while the still image encoder 408 generates still image data when the changed region information is transferred (Step 509).

In Step 505 or Step 509, the video encoder 407 extracts the region information from the received video region information, and encodes the image in the changed region indicated by the region information within the image in the frame buffer 403, thereby generating video data. The video data contains region information indicating the changed region together with an encoding result of the changed region. Meanwhile, the still image encoder 408 extracts the region information from the changed region information, and encodes the image in the changed region indicated by the region information within the image in the frame buffer 403, thereby generating still image data. The still image data contains region information indicating the changed region together with an encoding result of the changed region.

When the changed region information contains image quality information, the still image encoder 408 encodes the image in the changed region with the image quality indicated by the image quality information. In the case of the image quality corresponding to the less frequently changed region, for example, the still image encoder 408 may encode the image in the changed region with average image quality. In the case of image quality lower than the image quality corresponding to the less frequently changed region, the still image encoder 408 may encode the image in the changed region with image quality lower than the average image quality.

Next, the update information generation unit 409 generates update information containing video data or still image data, and the communication unit 112 transmits the update information to the terminal apparatus 102 (Step 506).

When the image in the frame buffer 403 is not updated (Step 501, NO), the transfer unit 410 checks whether or not operation information is received from the terminal apparatus 102 (Step 507).

When the operation information is received (Step 507, YES), the transfer unit 410 transfers the operation information to the execution unit 401 (Step 508). Then, the execution unit 401 issues a drawing command based on the operation information, and the screen generation unit 402 updates the image in the frame buffer 403 based on the drawing command. The information processing apparatus 101 repeats the processing from Step 501. On the other hand, when no operation information is received (Step 507, NO), the information processing apparatus 101 terminates the processing.

Figure 6:
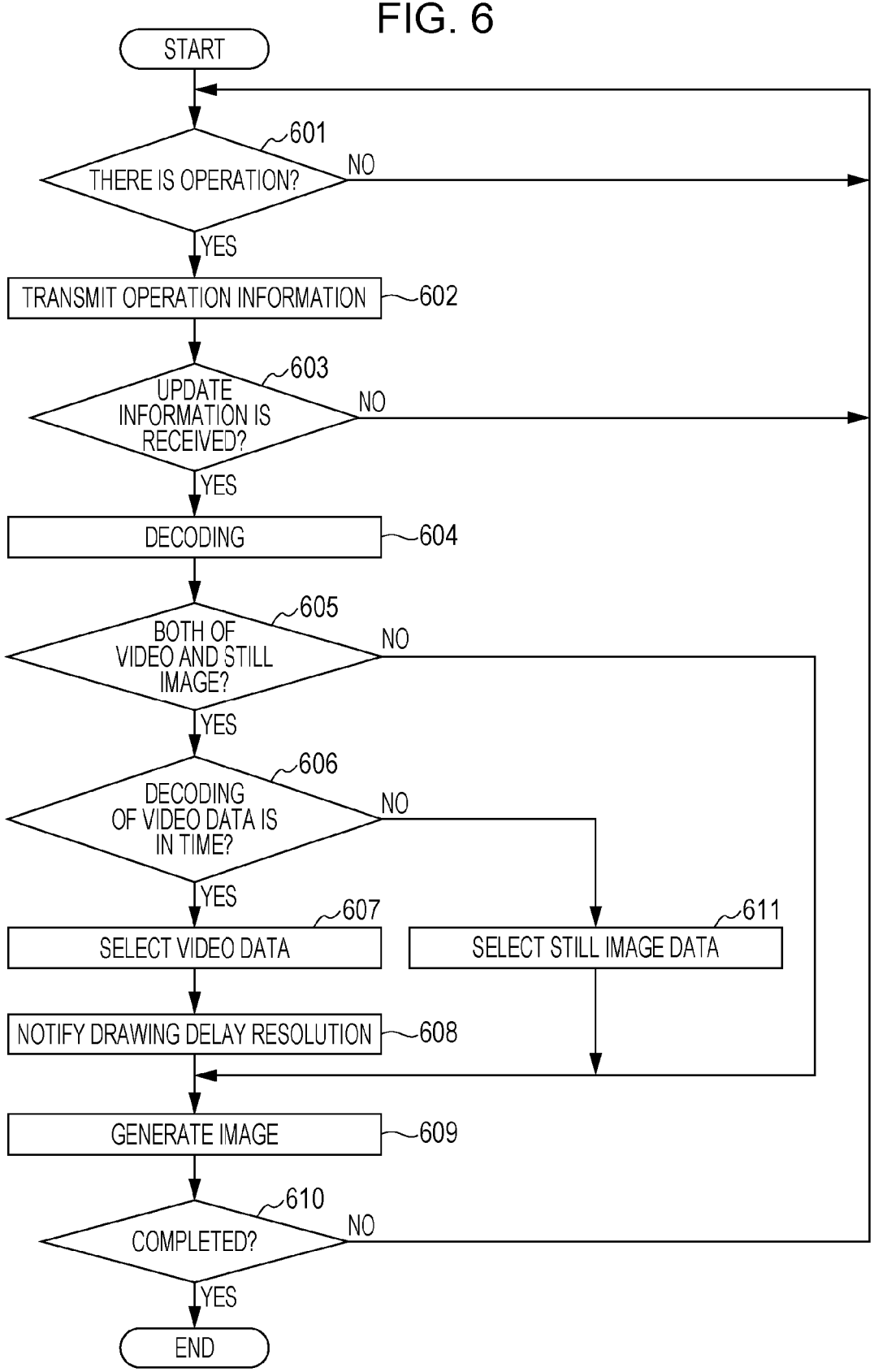
FIG. 6 is a flowchart illustrating a specific example of the drawing processing.

FIG. 6 is a flowchart illustrating a specific example of the drawing processing performed by the terminal apparatus 102 illustrated in FIG. 4. First, the detection unit 429 checks whether or not a user operation is performed, based on a signal from an input device in the terminal apparatus 102 (Step 601). When no operation is performed (Step 601, NO), the processing in Step 601 is repeated. On the other hand, when the operation is performed (Step 601, YES), the detection unit 429 transfers the operation information to the communication unit 121, and the communication unit 121 transmits the operation information to the information processing apparatus 101 (Step 602).

Next, the data extraction unit 427 checks whether or not update information is received from the information processing apparatus 101 (Step 603). When no update information is received (Step 603, NO), the terminal apparatus 102 repeats processing from Step 601. On the other hand, when the update information is received (Step 603, YES), the data extraction unit 427 extracts video data or still image data from the update information, transfers the video data to the video decoder 425, and transfers the still image data to the still image decoder 426. Then, the video decoder 425 decodes the video data to generate drawing data, and the still image decoder 426 decodes the still image data to generate drawing data (Step 604).

Thereafter, the control unit 424 checks whether both of the video data and the still image data are received (Step 605). When both of the video data and the still image data are received (Step 605, YES), the control unit 424 checks whether the decoding of the video data is completed by the drawing timing (Step 606).

When the decoding of the video data is not completed by the drawing timing (Step 606, NO), the control unit 424 selects the drawing data of the still image data and transfers the drawing data to the screen generation unit 423 (Step 611). On the other hand, when the decoding of the video data (Step 606, YES), the control unit 424 selects the drawing data of the video data and transfers the drawing data to the screen generation unit 423 (Step 607). Then, the communication unit 121 notifies the information processing apparatus 101 of the resolution of the drawing delay (Step 608).

When one of the video data and the still image data is received (Step 605, NO), the control unit 424 transfers the drawing data corresponding to the received data to the screen generation unit 423.

Next, the screen generation unit 423 generates an image from the drawing data and stores the image in the frame buffer 422, and the display unit 421 displays the image on the screen (Step 609).

Then, the detection unit 429 checks whether a termination operation is performed by the user (Step 610). When no termination operation is performed (Step 610, NO), the processing in Step 601 is repeated. On the other hand, when the termination operation is performed (Step 610, YES), the terminal apparatus 102 terminates the processing.

The terminal apparatus 102 may perform the processing in Steps 601 and 602 after the processing in Steps 603 and 604, or may execute the processing in Steps 601 and 602 in parallel with the processing in Steps 603 and 604.

Figure 7:
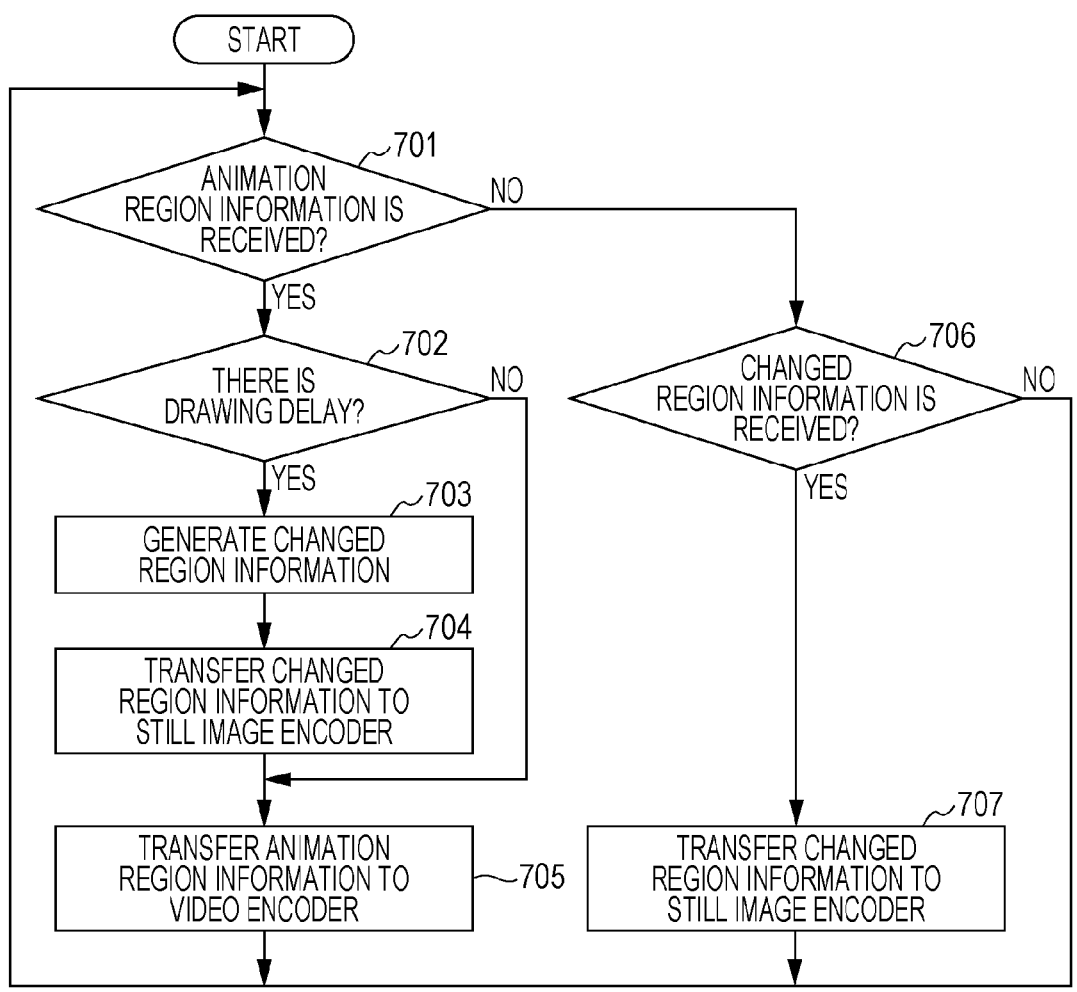
FIG. 7 is a flowchart of control processing by an information processing apparatus.

FIG. 7 is a flowchart illustrating an example of the control processing performed by the control unit 406 in the information processing apparatus 101 in Steps 504, 505 and 509 in FIG. 5. First, the control unit 406 checks whether or not the video region information is received from the region determination unit 405 (Step 701).

When the video region information is received (Step 701, YES), the control unit 406 checks whether there is a drawing delay (Step 702). For example, when the resolution of the drawing delay is not notified from the terminal apparatus 102 for the video region indicated by the video region information, the control unit 406 may determine that there is a drawing delay. On the other hand, when the resolution of the drawing delay is notified, the control unit 406 may determine that there is no drawing delay.

When there is a drawing delay (Step 702, YES), the control unit 406 generates changed region information from the video region information (Step 703), and transfers the generated changed region information to the still image encoder 408 (Step 704). Then, the control unit 406 transfers the video region information to the video encoder 407 (Step 705) and repeats the processing from Step 701.

On the other hand, when there is no drawing delay (Step 702, NO), the control unit 406 transfers the video region information to the video encoder 407 without generating the changed region information (Step 705) and repeats the processing from Step 701.

When no video region information is received (Step 701, NO), the control unit 406 checks whether or not the changed region information is received from the region determination unit 405 (Step 706). When the changed region information is received (Step 706, YES), the control unit 406 transfers the changed region information to the still image encoder 408 (Step 707) and repeats the processing from Step 701.

On the other hand, when no changed region information is received (Step 706, NO), the control unit 406 repeats the processing from Step 701.

Figure 8:
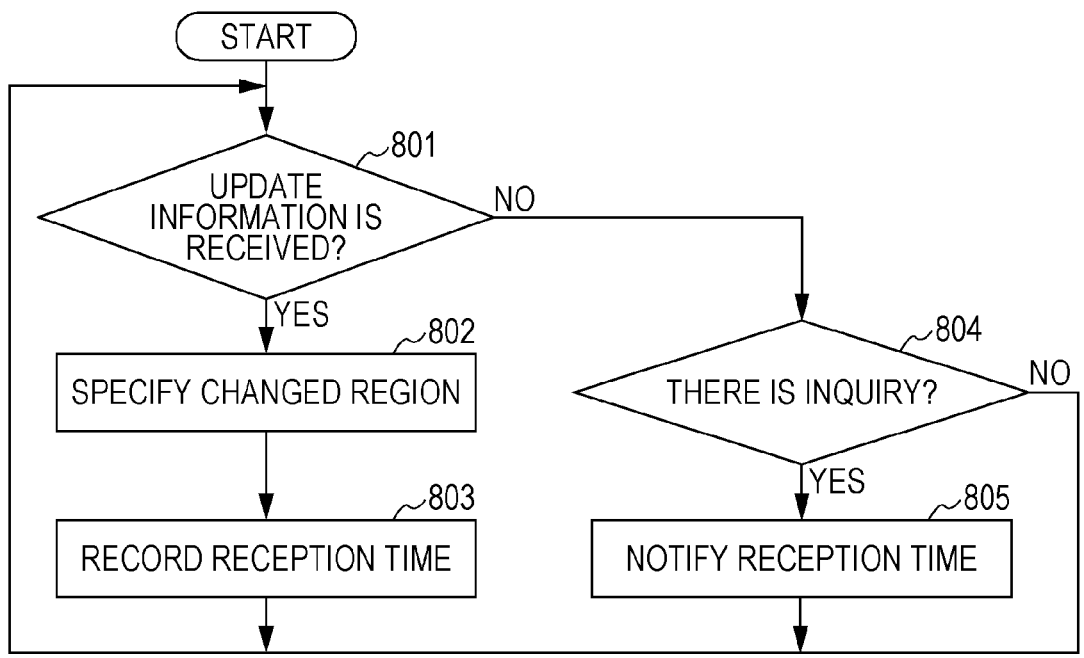
FIG. 8 is a flowchart of reception time management processing.

FIG. 8 is a flowchart illustrating an example of reception time management processing performed by the data extraction unit 427 in the terminal apparatus 102 in Step 603 of FIG. 6. First, the data extraction unit 427 checks whether or not the update information is received from the information processing apparatus 101 (Step 801). When the update information is received (Step 801, YES), the data extraction unit 427 extracts region information from the video data or still image data contained in the update information, and specifies a changed region based on the region information (Step 802).

Then, the data extraction unit 427 records a reception time of the update information in the storage unit 428 in association with the changed region (Step 803) and repeats the processing from Step 801. When two kinds of data, the video data and the still image data, are received for the same changed region, the reception time of the data received later is written over the reception time of the data received first.

On the other hand, when no update information is received (Step 801, NO), the data extraction unit 427 checks whether or not an inquiry regarding the reception time is received from the control unit 424 (Step 804). When the inquiry is received (Step 804, YES), the data extraction unit 427 reads the reception time corresponding to the changed region indicated by the inquiry from the storage unit 428, notifies the reception time to the control unit 424 (Step 805), and repeats the processing from Step 801. On the other hand, when no inquiry is received (Step 804, NO), the data extraction unit 427 repeats the processing from Step 801.

Figure 9:
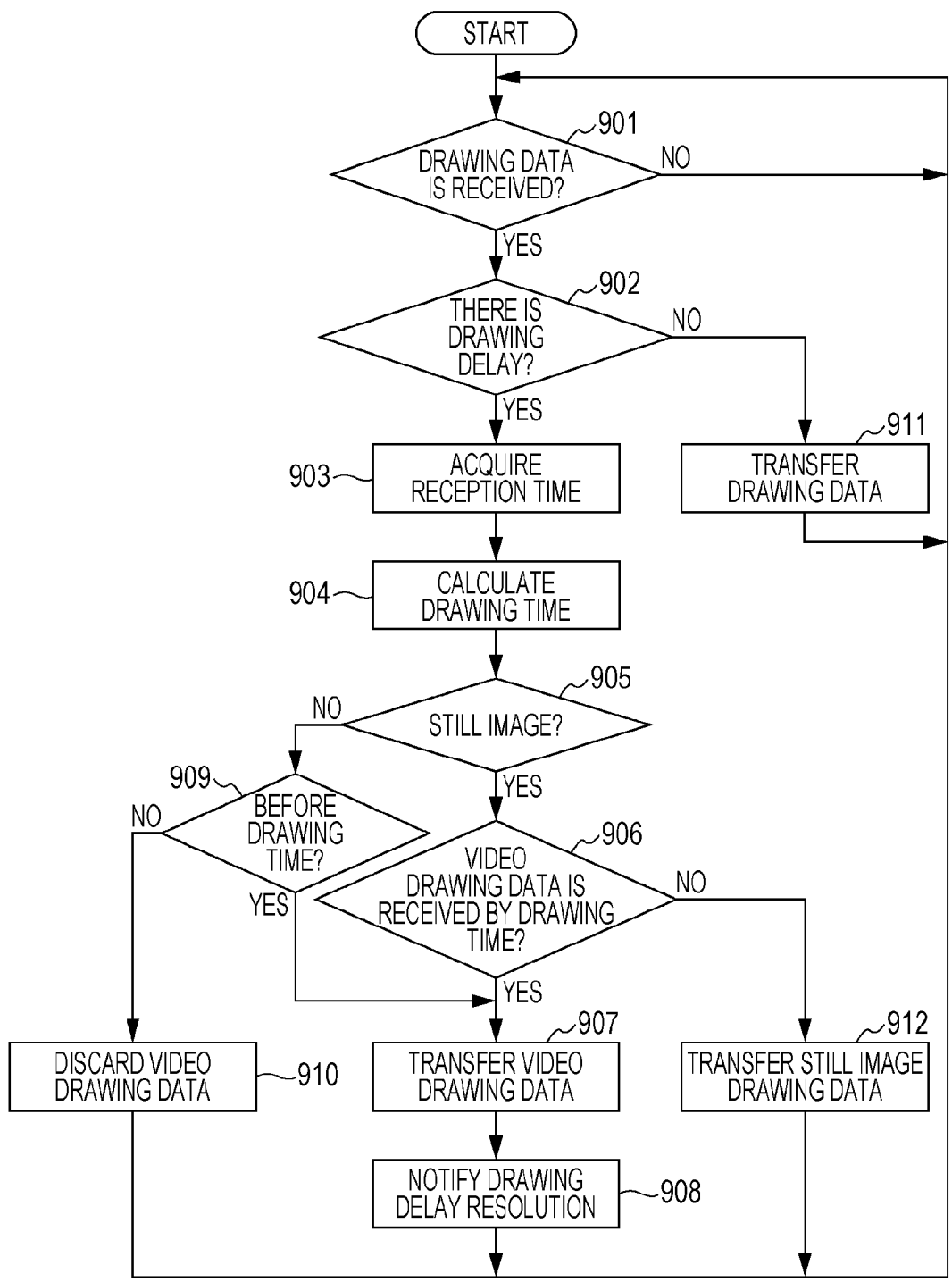
FIG. 9 is a flowchart of control processing by a terminal apparatus.

FIG. 9 is a flowchart illustrating an example of the control processing performed by the control unit 424 in the terminal apparatus 102 in Steps 605 to 608 and 611 of FIG. 6. First, the control unit 424 checks whether or not the drawing data is received from the video decoder 425 or the still image decoder 426 (Step 901). When no drawing data is received (Step 901, NO), the control unit 424 repeats the processing of Step 901.

On the other hand, when the drawing data is received (Step 901, YES), the control unit 424 checks whether or not there is a drawing delay in the terminal apparatus 102 (Step 902). For example, when the resolution of the drawing delay is not notified to the information processing apparatus 101 for the changed region of the video data, the control unit 424 may determine that there is a drawing delay. On the other hand, when the resolution of the drawing delay is notified, the control unit 424 may determine that there is no drawing delay.

When there is no drawing delay (Step 902, NO), the control unit 424 transfers the received drawing data to the screen generation unit 423 (Step 911) and repeats the processing from Step 901.

On the other hand, when there is a drawing delay (Step 902, YES), the control unit 424 makes an inquiry at the data extraction unit 427 about the reception time of the changed region corresponding to the received drawing data, and acquires the reception time (Step 903). Then, the control unit 424 calculates a drawing time of the drawing data based on the acquired reception time (Step 904).

In this event, the control unit 424 may calculate the drawing time by adding a predetermined time from the start of processing of a certain frame to the start of processing of the next frame to the reception time, for example. When the image displayed on the screen is updated at a frequency of N frames per second, 1/N second may be used as the predetermined time. For example, when N=30, the predetermined time is about 33 ms.

Next, the control unit 424 checks whether the received drawing data is the drawing data of the video data or the drawing data of the still image data (Step 905). When the received drawing data is the drawing data of the still image data (Step 905, YES), the control unit 424 waits for the drawing data of the video data corresponding to the same changed region to be transferred from the video decoder 425 until the drawing time (Step 906).

When the drawing data of the video data corresponding to the same changed region is not received by the drawing time (Step 906, NO), the control unit 424 transfers the received drawing data of the still image data to the screen generation unit 423 (Step 912) and repeats the processing from Step 901.

On the other hand, when the drawing data of the video data is received by the drawing time (Step 906, YES), the control unit 424 discards the previously received drawing data of the still image data, and transfers the received drawing data of the video data to the screen generation unit 423 (Step 907). Then, the control unit 424 notifies the information processing apparatus 101 of the resolution of the drawing delay through the communication unit 121 (Step 908) and repeats the processing from Step 901.

When the drawing data received in Step 901 is the drawing data of the video data (Step 905, NO), the control unit 424 compares the current time with the drawing time (Step 909). When the current time is before the drawing time (Step 909, YES), the control unit 424 performs the processing from Step 907. On the other hand, when the current time is past the drawing time (Step 909, NO), the control unit 424 discards the received drawing data of the video data (Step 910) and repeats the processing from Step 901.

According to such control processing, when only one of the still image data and the video data is transmitted from the information processing apparatus 101 for a certain changed region, the decoder corresponding to the kind of the data generates drawing data, and the drawing data is transferred to the screen generation unit 423.

On the other hand, when both of the still image data and the video data are transmitted from the information processing apparatus 101 for a certain changed region, and the terminal apparatus 102 receives the still image data before the video data, the drawing data is generated from both of the still image data and the video data. Then, depending on whether or not the drawing data of the video data is generated before the drawing time, only one of the drawing data of the video data and the drawing data of the still image data is transferred to the screen generation unit 423.

As a result, when the decoding of the video data is not finished within a predetermined time, the decoding result of the still image data corresponding to the video data is drawn. Thereafter, when the decoding of the video data is finished within the predetermined time, the drawing of the decoding result of the still image data is switched to drawing of the decoding result of the video data.

In the decoding of the video data, decoding of a coded picture in the first frame included in the video data tends to take a relatively long time. This is because, during the decoding of the coded picture in the first frame, not only the decoding of the coded picture but also initialization of the video decoder 425 is performed. For this reason, for the first several frames of the video data, the decoding of the coded pictures is not completed by the drawing time, leading to a possibility that the decoding result of the still image data is drawn instead.

Figure 10:
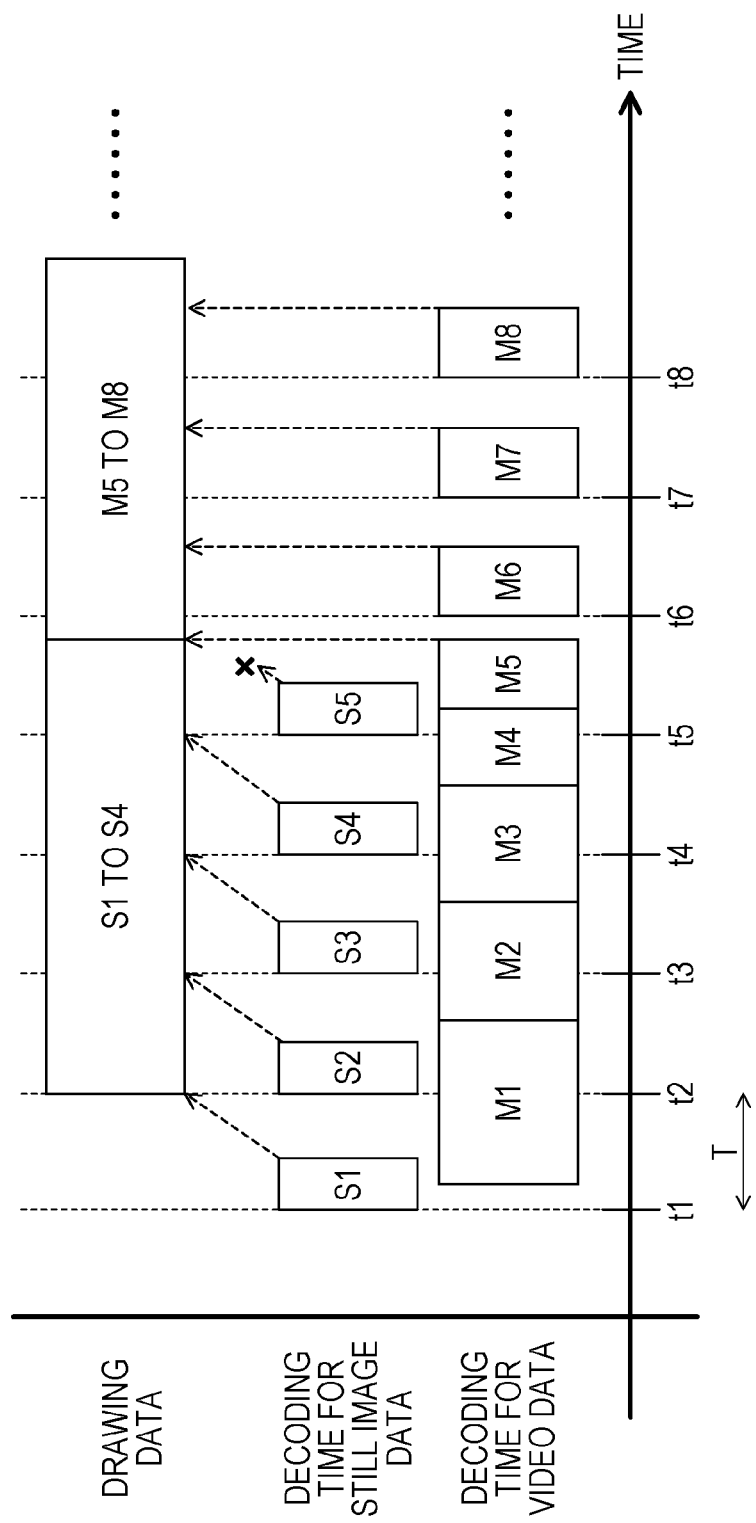
FIG. 10 is a timing chart of the drawing processing.

FIG. 10 is a timing chart illustrating an example of drawing processing when both of the still image data and the video data are transmitted for the same changed region. The interval between adjacent times ti and t (i+1) (i=1 to 7) corresponds to a predetermined time T from the start of processing of a certain frame to the start of processing of the next frame.

The information processing apparatus 101 generates still image data S1 to S5 and coded pictures M1 to M5 of the video data for first to fifth frames, and transmits the data and pictures to the terminal apparatus 102. The terminal apparatus 102 receives the still image data S1 to S5 at the times t1 to t5, respectively, and receives the coded pictures M1 to M5 at the times t1+Δt to t5+Δt, respectively. Δt is much shorter than the predetermined time T, for example.

The drawing times for the first to fifth frames are calculated by adding the predetermined time T to the times t1+Δt to t5+Δt. Thus, times t2+Δt to t6+Δt are obtained.

First, after the still image data S1 in the first frame received at the time t1 is decoded to generate drawing data of the still image data S1, decoding of the coded picture M1 in the first frame is not completed even after waiting until the drawing time t2+Δt of the first frame. Therefore, the drawing data of the still image data S1 is drawn at the drawing time t2+Δt. Thereafter, as the decoding of the coded picture M1 is completed, the drawing data of the coded picture M1 is discarded since the drawing time t2+Δt is past.

Next, after the still image data S2 in the second frame received at the time t2 is decoded to generate drawing data of the still image data S2, decoding of the coded picture M2 in the second frame is not completed even after waiting until the drawing time t3+Δt of the second frame. Therefore, the drawing data of the still image data S2 is drawn at the drawing time t3+Δt. Thereafter, as the decoding of the coded picture M2 is completed, the drawing data of the coded picture M2 is discarded since the drawing time t3+Δt is past.

Thereafter, after the still image data S3 in the third frame received at the time t3 is decoded to generate drawing data of the still image data S3, decoding of the coded picture M3 in the third frame is not completed even after waiting until the drawing time t4+Δt of the third frame. Therefore, the drawing data of the still image data S3 is drawn at the drawing time t4+Δt. Thereafter, as the decoding of the coded picture M3 is completed, the drawing data of the coded picture M3 is discarded since the drawing time t4+Δt is past.

Subsequently, after the still image data S4 in the fourth frame received at the time t4 is decoded to generate drawing data of the still image data S4, decoding of the coded picture M4 in the fourth frame is not completed even after waiting until the drawing time t5+Δt of the fourth frame. Therefore, the drawing data of the still image data S4 is drawn at the drawing time t5+Δt. Thereafter, as the decoding of the coded picture M4 is completed, the drawing data of the coded picture M4 is discarded since the drawing time t5+Δt is past.

Next, after the still image data S5 in the fifth frame received at the time t5 is decoded to generate drawing data of the still image data S5, decoding of the coded picture M5 in the fifth frame is completed before the drawing time t6+Δt of the fifth frame. Therefore, the drawing data of the still image data S5 is discarded without waiting until the drawing time t6+Δt, and the drawing data of the coded picture M5 is drawn. Then, the resolution of the drawing delay is notified to the information processing apparatus 101.

Meanwhile, the information processing apparatus 101 stops the transmission of the still image data and transmits only the video data for the sixth and subsequent frames. The terminal apparatus 102 receives coded pictures M6 to M8 of the sixth to eighth frames at times t6 to t8, respectively.

First, the coded picture M6 in the sixth frame received at the time t6 is decoded to generate drawing data of the coded picture M6. In this event, since the drawing delay is resolved, the drawing data of the coded picture M6 is drawn.

Next, the coded picture M7 in the seventh frame received at the time t7 is decoded to generate drawing data of the coded picture M7. In this event, since the drawing delay is resolved, the drawing data of the coded picture M7 is drawn.

Then, the coded picture M8 in the eighth frame received at the time t8 is decoded to generate drawing data of the coded picture M8. In this event, since the drawing delay is resolved, the drawing data of the coded picture M8 is drawn.

Likewise, for the ninth and subsequent frames, drawing data of the video data is generated and drawn.

As described above, when the decoding of the video data is not completed by the drawing timing, the frame rate in the terminal apparatus 102 may be maintained by performing the drawing using the drawing data of the still image data.

Particularly, when the video data contains an intra-coded picture (I picture) and one or more predictive-coded pictures following the I picture, decoding of the I picture tends to take longer than decoding of the predictive-coded picture. As the predictive-coded picture, a forward predictive-coded picture (P picture), a bidirectional predictive-coded picture (B picture) or the like is used.

In this case, the information processing apparatus 101 transmits still image data containing a coded image corresponding to the intra-coded picture and a coded image corresponding to each of the predictive-coded pictures. When decoding of the intra-coded picture and one or more predictive-coded pictures following the intra-coded picture is not completed by the drawing timing, the terminal apparatus 102 may maintain the frame rate by performing the drawing using the coded images corresponding to the respective pictures.

In the control processing illustrated in FIG. 9, when the received drawing data is the drawing data of the still image data, the control unit 424 waits for the drawing data of the video data corresponding to the same changed region until the drawing time. However, in this control processing, even when only the still image data is transmitted from the information processing apparatus 101, the drawing data of the video data is waited for, and thus the drawing of the frames is not started until the drawing time.

Therefore, a method is conceivable for immediately transferring the drawing data of the still image data to the screen generation unit 423 without waiting for the drawing data of the video data. In this method, the drawing processing does not have to wait until the drawing time. Thus, the drawing delay is improved compared with the control processing illustrated in FIG. 9.

Figure 11:
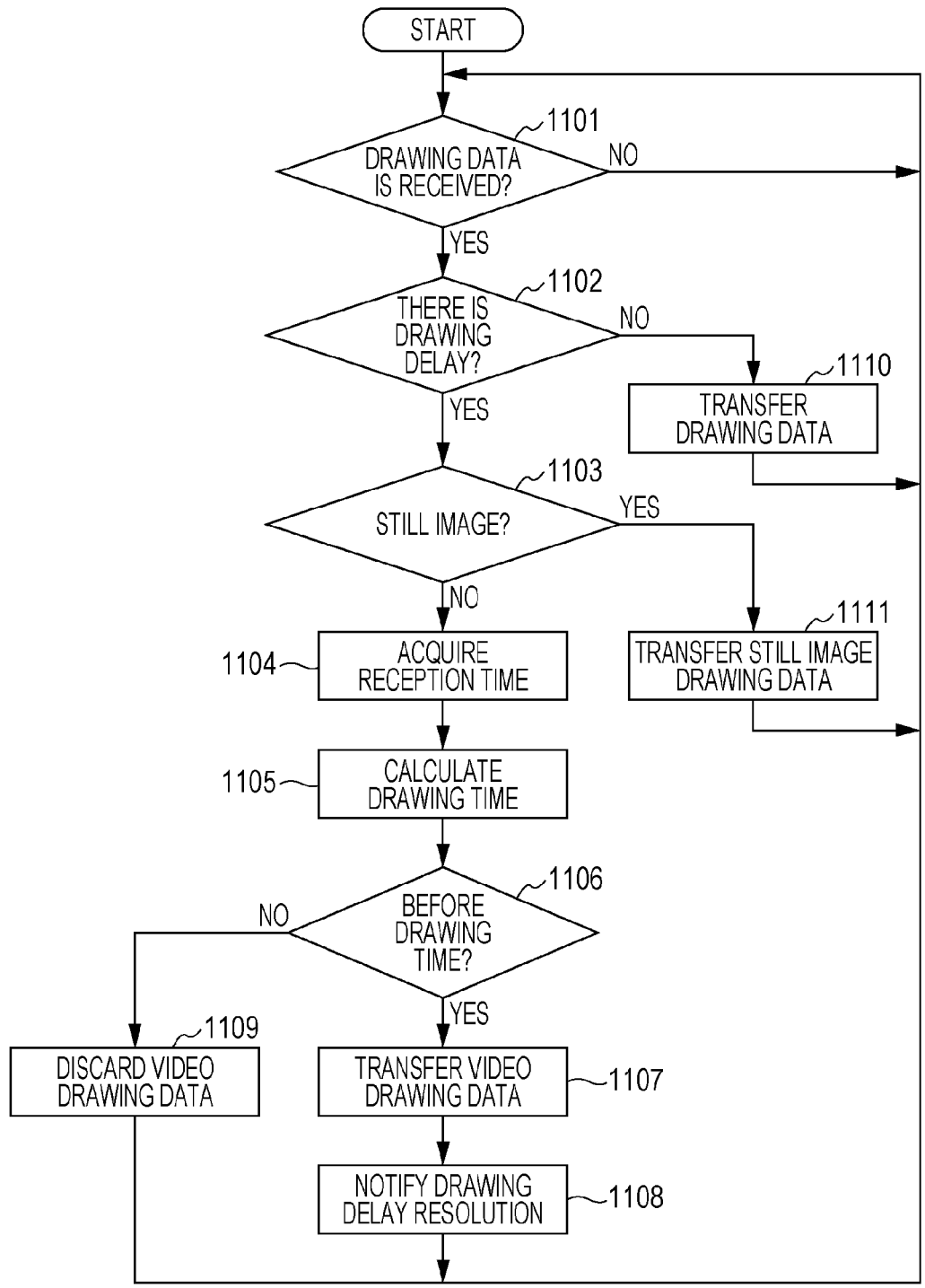

FIG. 11 is a flowchart illustrating an example of the control processing to immediately transfer the drawing data of the still image data to the screen generation unit 423. The processing of Steps 1101, 1102, and 1110 in FIG. 11 is the same as the processing of Steps 901, 902, and 911 in FIG. 9.

When there is a drawing delay (Step 1102, YES), the control unit 424 checks whether the received drawing data is the drawing data of the video data or the drawing data of the still image data (Step 1103). When the received drawing data is the drawing data of the still image data (Step 1103, YES), the control unit 424 transfers the drawing data of the still image data to the screen generation unit 423 (Step 1111) and repeats the processing from Step 1101.

On the other hand, when the received drawing data is the drawing data of the video data (Step 1103, NO), the control unit 424 makes an inquiry at the data extraction unit 427 about the reception time of the changed region corresponding to the received drawing data, and acquires the reception time (Step 1104). Then, the control unit 424 calculates a drawing time of the drawing data based on the acquired reception time (Step 1105).

Next, the control unit 424 compares the current time with the drawing time (Step 1106). When the current time is before the drawing time (Step 1106, YES), the control unit 424 transfers the received drawing data of the video data to the screen generation unit 423 (Step 1107). Then, the control unit 424 notifies the information processing apparatus 101 of the resolution of the drawing delay through the communication unit 121 (Step 1108) and repeats the processing from Step 1101.

On the other hand, when the current time is past the drawing time (Step 1106, NO), the control unit 424 discards the received drawing data of the video data (Step 1109) and repeats the processing from Step 1101.

According to such control processing, when the terminal apparatus 102 receives the still image data for a certain changed region before the video data for the same changed region, the drawing data of the still image data is immediately transferred to the screen generation unit 423. As a result, once the still image data corresponding to the video data is decoded, the terminal apparatus 102 may immediately draw the decoding result of the still image data without waiting until the drawing time. Thus, the drawing delay is improved compared with the control processing illustrated in FIG. 9.

Figure 12:
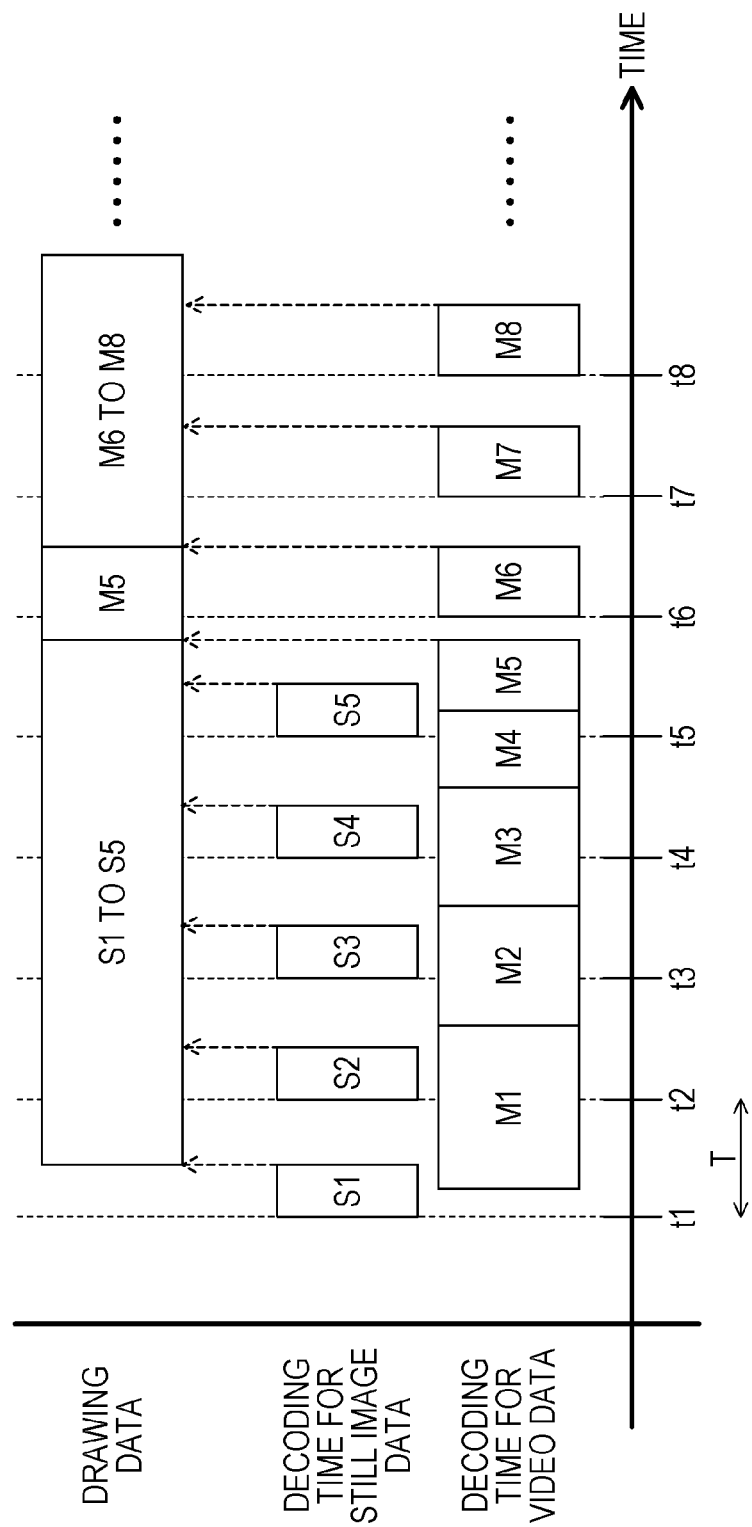

FIG. 12 is a timing chart illustrating an example of drawing processing based on the control processing illustrated in FIG. 11. As in the case of FIG. 10, the information processing apparatus 101 generates still image data S1 to S5 and coded pictures M1 to M5 of the video data for first to fifth frames, and transmits the data and pictures to the terminal apparatus 102. The terminal apparatus 102 receives the still image data S1 to S5 at times t1 to t5, respectively, and receives the coded pictures M1 to M5 at times t1+Δt to t5+Δt, respectively.

As in the case of FIG. 10, the drawing times for the first to fifth frames are times t2+Δt to t6+Δt, respectively.

First, the drawing data of the still image data S1 is immediately drawn after the still image data S1 in the first frame received at the time t1 is decoded to generate drawing data of the still image data S1. Thereafter, as the decoding of the coded picture M1 in the first frame is completed, the drawing data of the coded picture M1 is discarded since the drawing time t2+Δt of the first frame is past.

Next, the drawing data of the still image data S2 is immediately drawn after the still image data S2 in the second frame received at the time t2 is decoded to generate drawing data of the still image data S2. Thereafter, as the decoding of the coded picture M2 in the second frame is completed, the drawing data of the coded picture M2 is discarded since the drawing time t3+Δt of the second frame is past.

Then, the drawing data of the still image data S3 is immediately drawn after the still image data S3 in the third frame received at the time t3 is decoded to generate drawing data of the still image data S3. Thereafter, as the decoding of the coded picture M3 in the third frame is completed, the drawing data of the coded picture M3 is discarded since the drawing time t4+Δt of the third frame is past.

Thereafter, the drawing data of the still image data S4 is immediately drawn after the still image data S4 in the fourth frame received at the time t4 is decoded to generate drawing data of the still image data S4. Thereafter, as the decoding of the coded picture M4 in the fourth frame is completed, the drawing data of the coded picture M4 is discarded since the drawing time t5+Δt of the fourth frame is past.

Subsequently, the drawing data of the still image data S5 is immediately drawn after the still image data S5 in the fifth frame received at the time t5 is decoded to generate drawing data of the still image data S5. Thereafter, the decoding of the coded picture M5 in the fifth frame is completed before the drawing time t6+Δt of the fifth frame. Thus, the drawing data of the coded picture M5 is written over the drawing data of the still image data S5. Then, the resolution of the drawing delay is notified to the information processing apparatus 101.

Meanwhile, the information processing apparatus 101 stops the transmission of the still image data and transmits only the video data for the sixth and subsequent frames. Thereafter, as in the case of FIG. 10, the terminal apparatus 102 receives coded pictures M6 to M8 of the sixth to eighth frames, and draws the drawing data of those pictures. Likewise, for the ninth and subsequent frames, drawing data of the video data is drawn.

According to such drawing processing, the drawing processing of the first to fifth frames may be started sooner than the case of FIG. 10.

The configuration of the drawing system illustrated in FIGS. 1 and 4 is just an example, and some of the components may be omitted or changed according to the purpose and conditions of the drawing system. For example, it is conceivable that the frame buffer 403 is provided outside the information processing apparatus 101 and the execution of the operating system and various applications based on the operation information as well as the drawing processing based on the execution result are performed outside the information processing apparatus 101. In this case, the execution unit 401, the screen generation unit 402, the frame buffer 403, and the transfer unit 410 illustrated in FIG. 4 may be omitted. Moreover, when the changed region information and the video region information are generated outside the information processing apparatus 101, the region generation unit 404, and the region determination unit 405 illustrated in FIG. 4 may be omitted.

When the detection of the user operation information is performed outside the terminal apparatus 102, the detection unit 429 illustrated in FIG. 4 may be omitted. Also, when the reception time of the update information is not used to calculate the drawing time, the storage unit 428 illustrated in FIG. 4 may be omitted.

The flowcharts of FIGS. 2, 3, 5 to 9, and 11 are just an example, and some part of the processing may be omitted or changed according to the configuration and conditions of the drawing system. For example, when the execution of the operating system and various applications based on the operation information as well as the drawing processing based on the execution result are performed outside the information processing apparatus 101, the processing of Steps 507 and 508 in FIG. 5 may be omitted. Moreover, when the changed region information and the video region information are generated outside the information processing apparatus 101, the processing of Steps 501 to 503 in FIG. 5 may be omitted.

When the detection of the user operation information is performed outside the terminal apparatus 102, the processing of Steps 601 and 602 in FIG. 6 may be omitted. Also, when the reception time of the update information is not used to calculate the drawing time, the reception time management processing illustrated in FIG. 8 may be omitted.

In the control processing of FIG. 9 or FIG. 11, the control unit 424 may also check whether or not the decoding of the video data is completed by the drawing timing, based on an index other than the drawing time. As the index other than the drawing time, an index indicating the processing load of the video decoder 425, or the like is used.

The timing charts of FIGS. 10 and 12 are just an example, and it is conceivable that it takes a long time to decode coded pictures in frames other than the first frame contained in the video data takes a long time. For example, when it takes a long time to decode a coded picture in a frame in the middle of the video data, the decoding result of the still image data is drawn for several frames after the frame.

Figure 13:
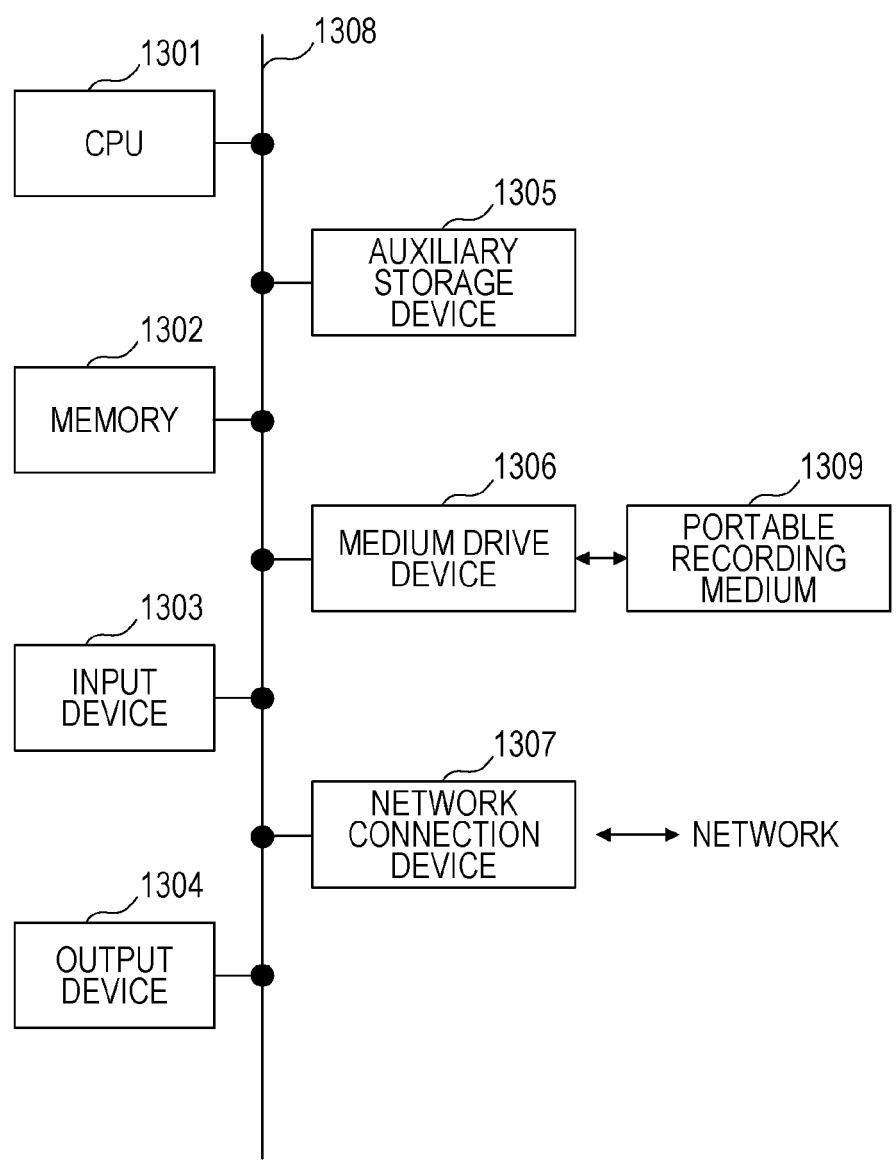
FIG. 13 is a configuration diagram of the information processing apparatus.

The information processing apparatus 101 and the terminal apparatus 102 illustrated in FIGS. 1 and 4 may be realized using an information processing apparatus (computer) as illustrated in FIG. 13, for example.

The information processing apparatus illustrated in FIG. 13 includes a central processing unit (CPU) 1301, a memory 1302, an input device 1303, an output device 1304, an auxiliary storage device 1305, a medium drive device 1306, and a network connection device 1307. These components are connected to each other through a bus 1308.

The memory 1302 is a read only memory (ROM), a random access memory (RAM) or a semiconductor memory such as a flash memory, for example. The memory 1302 stores a drawing control program or a drawing program and data. The memory 1302 may be used as the frame buffer 403 or the frame buffer 422 and the storage unit 428 illustrated in FIG. 4.

When the information processing apparatus illustrated in FIG. 13 is the information processing apparatus 101, the CPU 1301 operates as the generation unit 111 illustrated in FIGS. 1 and 4 by executing the drawing control program using the memory 1302, for example, and performs the drawing control processing. The CPU 1301 also operates as the execution unit 401, the screen generation unit 402, the transfer unit 410, the region generation unit 404, the region determination unit 405, the control unit 406, the video encoder 407, the still image encoder 408 and the update information generation unit 409.

When the information processing apparatus illustrated in FIG. 13 is the terminal apparatus 102, the CPU 1301 operates as the decoder unit 122 and the drawing unit 123 illustrated in FIGS. 1 and 4 by executing the drawing program using the memory 1302, for example, and performs the drawing processing. The CPU 1301 also operates as the data extraction unit 427, the detection unit 429, the screen generation unit 423, the control unit 424, the video decoder 425 and the still image decoder 426.

The input device 1303 is a keyboard, a pointing device or the like, for example, and is used to input instructions and information from a user or an operator. The output device 1304 is a display device, a printer, a speaker or the like, for example, and is used to output processing results and inquiries to the user or the operator.

When the information processing apparatus illustrated in FIG. 13 is the terminal apparatus 102, the detection unit 429 may detect user operation information through the input device 1303, and the output device 1304 may display images transferred from the display unit 421 on a screen.

The auxiliary storage device 1305 is a magnetic disk device, an optical disk device, a magneto-optical disk device, a tape device, or the like, for example. The auxiliary storage device 1305 may be a hard disk drive or a flash memory. The information processing apparatus may store the drawing control program or the drawing program and the data in the auxiliary storage device 1305, and load the program and data into the memory 1302 for use. The auxiliary storage device 1305 may be used as the storage unit 428.

The medium drive device 1306 drives a portable recording medium 1309 and accesses contents recorded therein. The portable recording medium 1309 is a memory device, a flexible disk, an optical disk, a magnetooptical disk or the like. The portable recording medium 1309 may be a compact disk read only memory (CD-ROM), a digital versatile disk (DVD), a Universal Serial Bus (USB) memory or the like. The user or the operator may store a design support program and data in the portable recording medium 1309 and load the program and data into the memory 1302 for use.

As described above, the computer-readable recording medium storing the drawing control program or the drawing program and the data includes physical (non-temporary) recording media such as the memory 1302, the auxiliary storage device 1305, and the portable recording medium 1309.

The network connection device 1307 is a communication interface that is connected to a communication network such as a local area network (LAN) and the Internet, and performs data conversion associated with communication. The network connection device 1307 may be used as the communication unit 112 or the communication unit 121 illustrated in FIGS. 1 and 4.

Note that the information processing apparatus does not have to include all the components illustrated in FIG. 13, and some of the components may be omitted according to the purpose and conditions. When the information processing apparatus illustrated in FIG. 13 is the information processing apparatus 101, for example, the input device 1303 and the output device 1304 may be omitted. Moreover, when the information processing apparatus does not access the portable recording medium 1309, the medium drive device 1306 may be omitted.

Although the disclosed embodiment and the advantages thereof are described in detail, those skilled in the art may make various changes, additions and omissions without departing from the scope of the embodiment explicitly described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A drawing system comprising:
   an information processing apparatus including
      a video encoder;
      a still image encoder;
      at least one memory storing instructions; and
      at least one processor that executes the instructions to cause the following to be performed:
         generating, using the video encoder, video data corresponding to a frequently changed region whose change frequency in an image exceeds a predetermined threshold,
         generating, using the still image encoder, still image data corresponding to the video data, and
         transmitting the video data and the still image data to a terminal apparatus; and
   the terminal apparatus including
      a video decoder;
      a still image decoder;
      at least one memory storing instructions; and
      at least one processor that executes the instructions to cause the following to be performed:
         receiving the video data and the still image data from the information processing apparatus,
         decoding, using the video decoder, the video data,
         decoding, using the still image decoder, the still image data, and
         drawing the decoded still image data when decoding of the video data is not completed by drawing timing, and switching the drawing of the decoded still image data to drawing of the decoded video data when the decoding of the video data catches up with the drawing timing,
   wherein, when the decoding of the video data catches up with the drawing timing,
      the at least one processor included in the terminal apparatus executes the instructions stored in the at least one memory included in the terminal apparatus to instruct the information processing apparatus to terminate the transmission of the still image data, and
      the at least one processor included in the information processing apparatus executes the instructions stored in the at least one memory included in the information processing apparatus to, in response to the instruction from the terminal apparatus,
         terminate the generation of the still image data, and terminate the transmission of the still image data.

2. The drawing system according to claim 1, wherein the drawing draws the decoded still image data when the decoding of the video data is not finished within a predetermined time, and switches the drawing of the decoded still image data to the drawing of the decoded video data when the decoding of the video data is finished within the predetermined time.

3. The drawing system according to claim 1, wherein
the drawing draws the decoded still image data immediately after the still image data is decoded, and switches the drawing of the decoded still image data to the drawing of the decoded video data when the decoding of the video data is finished within the predetermined time.

4. The drawing system according to claim 1, wherein
the generating the still image data generates the still image data when the video data contains an intra-coded picture, and the still image data contains a coded image corresponding to the intra-coded picture and one or more coded images corresponding to one or more predictive-coded pictures following the intra-coded picture.

5. The drawing system according to claim 1, wherein
the generating the still image data generates still image data with first image quality corresponding to a less frequently changed region with the change frequency that does not exceed the predetermined threshold,
the transmitting transmits the still image data with the first image quality to the terminal apparatus, and
the still image data corresponding to the video data is still image data with second image quality lower than the first image quality.

6. An information processing apparatus comprising:
a video encoder,
a still image encoder,
at least one memory storing instructions, and
at least one processor that executes the instructions to cause the following to be performed:
  generating, using the video encoder, video data corresponding to a frequently changed region whose change frequency in an image exceeds a predetermined threshold,
  generating, using the still image encoder, still image data corresponding to the video data, and
  transmitting the video data and the still image data to a terminal apparatus, the terminal apparatus being configured to decode the video data and the still image data, draw the decoded still image data when decoding of the video data is not completed by drawing timing and to switch the drawing of the decoded still image data to drawing of the decoded video data when the decoding of the video data catches up with the drawing timing,
wherein, when the decoding of the video data catches up with the drawing timing, the terminal apparatus instructs the information processing apparatus to terminate the transmission of the still image data, and, in response to the instruction from the terminal apparatus, the generating the still image data terminates the generation of the still image data, and
the transmitting terminates the transmission of the still image data.

7. A drawing control method comprising:
generating, by a video encoder included in an information processing apparatus, video data corresponding to a frequently changed region whose change frequency in an image exceeds a predetermined threshold;
generating, by a still image encoder included in the information processing apparatus, still image data corresponding to the video data; and
transmitting, by the information processing apparatus, the video data and the still image data to a terminal apparatus configured to decode the video data and the still image data, draw the decoded still image data when decoding of the video data is not completed by drawing timing and to switch the drawing of the decoded still image data to drawing of the decoded video data when the decoding of the video data catches up with the drawing timing,
wherein, when the decoding of the video data catches up with the drawing timing, the terminal apparatus instructs the information processing apparatus to terminate the transmission of the still image data, and the information processing apparatus terminates the generation and transmission of the still image data.

* * * * *